United States Patent [19]

Caveney

[11] Patent Number: 5,038,283

[45] Date of Patent: Aug. 6, 1991

[54] SHIPPING METHOD

[75] Inventor: Jack E. Caveney, Hinsdale, Ill.

[73] Assignee: Panduit Corp., Tinley Park, Ill.

[21] Appl. No.: 337,598

[22] Filed: Apr. 13, 1989

[51] Int. Cl.$^5$ ............................................. G06F 15/20
[52] U.S. Cl. .................................... 364/403; 235/385;
235/384; 364/478; 364/401; 364/222.6;
364/917.5; 364/200; 364/900
[58] Field of Search ................ 235/385, 384; 364/403,
364/401, 200 MS File, 900 MS File, 478

[56] References Cited

U.S. PATENT DOCUMENTS

| | | | |
|---|---|---|---|
| 3,631,993 | 1/1972 | Young | 214/16.4 A |
| 4,340,810 | 7/1982 | Glass | 235/385 X |
| 4,588,881 | 5/1986 | Pejas et al. | 235/385 |
| 4,591,705 | 5/1986 | Toudou | 235/381 |
| 4,621,325 | 11/1986 | Naftzger et al. | 235/385 X |
| 4,672,553 | 6/1987 | Goldberg | 364/478 |
| 4,783,740 | 11/1988 | Ishizawa et al. | 235/385 X |
| 4,832,204 | 5/1989 | Hardy et al. | 235/385 X |
| 4,887,208 | 12/1989 | Schneider et al. | 235/385 X |

FOREIGN PATENT DOCUMENTS

| | | |
|---|---|---|
| 1459526 | 12/1976 | France . |
| 156660 | 3/1922 | United Kingdom . |
| 1351010 | 4/1974 | United Kingdom . |
| 2175566 | 12/1986 | United Kingdom . |

Primary Examiner—Jerry Smith
Assistant Examiner—Steven Killy
Attorney, Agent, or Firm—Charles R. Wentzel; Mark D. Hilliard

[57] ABSTRACT

A shipping method for facilitating the efficient distribution of goods transmits from a shipping location computer a container packing record identifying an individual container and the items contained therein to a programmable computer located at the shipping destination of the container such that as a container is received at the shipping destination a bar code on the container can be entered into the computer data base and used to identify the container packing record for the container and all of the items contained within the container. The shipping destination computer is programmed to compare the items in the container and provide an output directing the container directly to an order packing area when items needed to fill customer orders are contained within the received container, or, if none of the items are needed to fill a customer order, directing the container to general inventory. The shipping method eliminates the inefficiency of placing items needed to immediately fill customer orders into general inventory and subsequently removing the same items from general inventory to fill a customer's order.

6 Claims, 2 Drawing Sheets

SHIPPING METHOD

TECHNICAL FIELD

The present invention relates to a shipping method for facilitating the efficient distribution of goods.

BACKGROUND ART

Typically, goods are provided to an ultimate user by the shipment of the goods from one location, such as from a manufacturer, to a stocking distributor where the goods are entered into the stocking distributor's inventory. Subsequently the goods are drawn from inventory and used to fill a customer's order, probably in combination with goods from the same or another source also drawn from inventory.

Often the stocking distributor's inventory of a certain type of goods is exhausted, preventing the execution and shipping of an outstanding order requiring such goods. The execution of such an order is delayed if the goods necessary to fill an outstanding order are received by the stocking distributor, put into the distributor's inventory and then subsequently removed from inventory to fill an outstanding order.

DISCLOSURE OF THE INVENTION

It is the object of the present invention to provide a shipping method that reduces shipping delay resulting from out-of-stock goods to a minimum, that reduces inventory expense of a stocking distributor and improves the efficiency of the shipment and distribution of goods.

In general, the shipping method of the present invention includes the steps of:

labeling individual items to be shipped with item identification indicia;

labeling a shipment container with a container indicia;

recording in a shipping location computer data base the container indicia and the identification indicia of items shipped in the container as a container packing record such that quantities of individual items are identified with the container within which they are shipped;

transmitting the container packing record to a data base accessible by a shipping destination computer at a shipping destination;

providing a general inventory stock area at the shipping destination;

providing an order packing area at the shipping destination for packaging of orders for shipment from the shipping destination;

recording in a data base accessible by the shipping destination computer a customer order list of identification indicia of items necessary to fill customer orders;

recording in a data base accessible by the shipping destination computer the container indicia of containers received at the shipping destination;

providing the shipping destination computer with a program to compare the identification indicia of the items recorded in the container packing record for the container indicia of a received container with the identification indicia of the items in the customer order list and to provide an output directing the received container to the order packing area if the comparison determines that the received container contains an item that should be packed for shipment, or directing the received container to the general inventory stock area if the comparison determines that the received container does not contain an item that should be packed for shipment; and providing items from the received container in the order packing area to fill the customer order.

PREFERRED METHOD OF CARRYING OUT THE INVENTION

Figure 1:
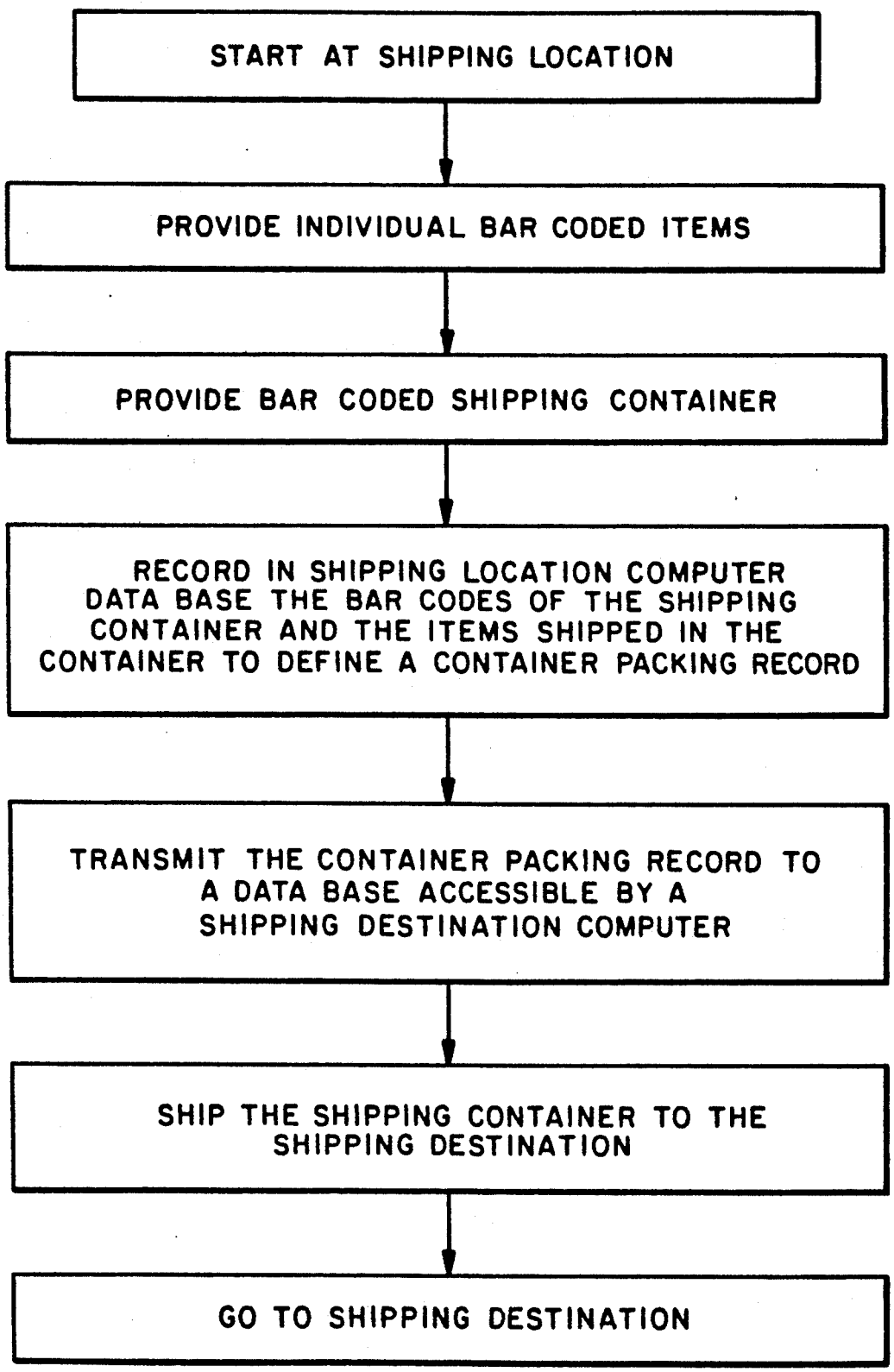
FIG. 1 is a flow chart illustrating the method steps of the present invention performed at the shipping location.
Figure 2:
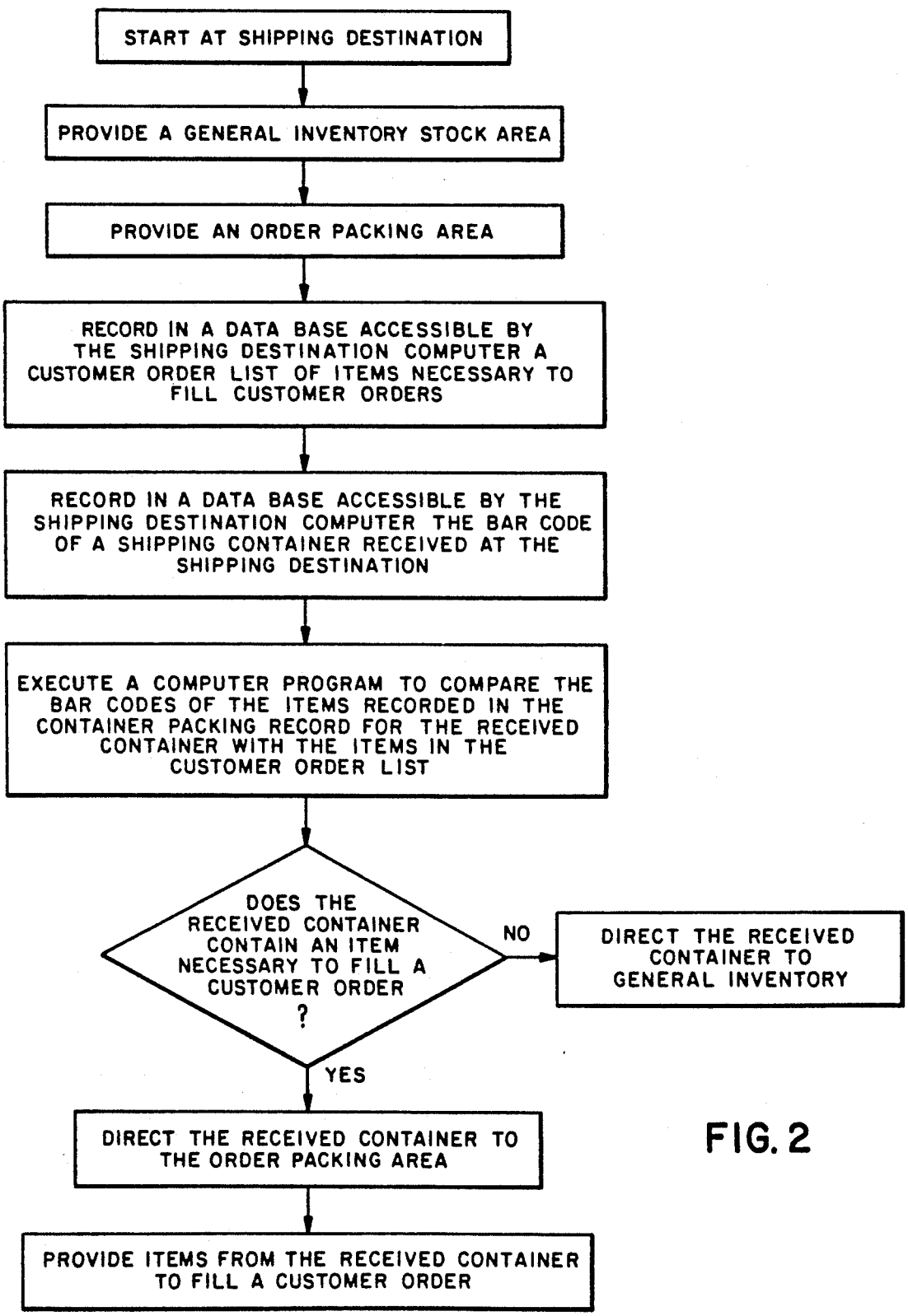
FIG. 2 is a flow chart illustrating the method steps of the present invention performed at the shipping destination.

The shipping method of the present invention is best accomplished by providing bar code labels on each of the individual items to be shipped and a unique bar code for each of the containers within which the individual items are packed for shipping. The bar codes for the items and the containers are chosen to uniquely identify identical items and each packing container and thus act as identification indicia. The bar codes are positioned on the outside of the container and item packages at a location that allows easy access by a bar code reader. The use of bar codes to identify packaged items is well known, as is the use of bar code readers that facilitate the entry of the bar code information into a digital computer data base.

Thus, as individual bar coded items are packed within a container, a packer would use a bar code reader connected to a shipping location computer to initially read the bar code label of each item packed within the container. Software in the computer would then cause a unique bar coded container label to be printed and would record the identifying alpha-numeric information read from each bar code within its memory with the bar code identifying the container as a grouped set of information comprising a container packing record. The packer would affix the container label to the container. The container packing record would also include a shipment indicia uniquely identifying the specific means of shipment, for example the specific truck used to deliver the container to the shipping destination. Thus, containers that are to be shipped together to the same shipping destination would include in their container packing records an identical unique shipment indicia.

The container packing records of individual containers would then be transmitted from the shipping location computer by a computer modem through the telecommunication lines to a shipping destination computer located at the shipping destination of the containers. The shipping destination computer would enter the transmitted container packing record into a data base accessible by the computer.

Included within the shipping destination computer's data base would be previously recorded outstanding customer order lists listed by the priority of each customer order, the customer order lists containing quantities of items ordered by individual customers including identifying indicia or bar code information for each item. If needed, a bar code cross reference list could be stored in the shipping destination computer and used to match customer codes identifying individual items ordered with the corresponding bar code used on the package of each item.

When a container is first received at the shipping destination, the receiving clerk would use a bar code reader to enter the container bar code into the shipping destination computer as a received container. The computer would be programmed to determine from the previously received container packing record, the identity of the items contained within the received container and compare these items to items necessary to fill outstanding customer orders.

If items necessary to fill a customer order are contained within the received container, the shipping destination computer would provide an output directing the container to the order packing area where the items could be removed from the receiving container and repackaged with other items necessary to fill the order, thus eliminating the inefficient placing of the items needed to fill outstanding orders into inventory and the necessity of their subsequent withdrawal from inventory.

If it is desired to ship additional items from inventory with items just received, the shipping destination computer program would also provide an output directing items from the general inventory stock area to the order packing area and would release a packing and shipping order when all items required for a shipment were in a packing area.

The computer program instructions would be chosen to maximize the efficient control of inventory by basing the decision of whether to send received containers to inventory or to the order packing area upon such factors as whether or not the combination of items just received in a shipment together with items stored in the general inventory stock area will allow the release of a shipment, the priority of outstanding orders, the space available in the order packing area and any other factors found to influence the efficient operation of the order packing area.

Additionally, the output provided directing the received container to the order packing area would include directions to a particular location in the order packing area for each particular received container. For example, the output would consist of a label marked with a letter from A to Z which would be affixed to the received container to direct the received container to a particular location in the order packing area. Thus, numerous received containers can each be directed to particular locations at a particular order packing area and used as temporary locations, with the shipping destination computer providing an output with the location of the items needed to fill a customer's order from the individual temporary A-Z locations. If any items remain in an individual container after the customer's order has been filled, these items would be directed to general inventory. All items directed to general inventory from the temporary packing locations or from the shipment receiving location would be directed to specified locations in the general inventory stocking area.

The shipping destination computer would also be programmed to identify from the container packing records the shipping containers that are shipped together in a single shipment and compare the bar codes of shipping containers as they are actually received with the list of containers shipped in a single shipment and provide an output either confirming the receipt of all of the containers previously shipped in the single shipment or providing an output listing the containers lost in shipment. Such an instant accounting of lost containers would facilitate the immediate resolution of the number of containers lost in shipment and facilitate the proper payment for items received.

It should be noted that although the shipping method has been illustrated in relation to a manufacturer and a stocking distributor of the manufacturer, that the method described and claimed herein would achieve its objects at any level in a multilevel distribution network and could be successfully used to facilitate the efficient distribution of goods throughout a multiple chain of distributors and subdistributors.

I claim:

1. A shipping method, comprising the steps of:
providing individual items to be shipped with item identification indicia;
providing a shipment container with a container indicia;
recording in a shipping location computer data base the container indicia and the identification indicia of items shipped in the container as a container packing record such that quantities of individual items are identified with the container within which they are shipped;
transmitting the container packing record to a data base accessible by a shipping destination computer at a shipping destination;
providing a general inventory stock area at the shipping destination;
providing an order packing area at the shipping destination for packaging of orders for shipment from the shipping destination;
recording in a date base accessible by the shipping destination computer a customer order list of identification indicia of items necessary to fill customer orders;
recording in a data base accessible by the shipping destination computer the container indicia of containers received at the shipping destination;
providing the shipping destination computer with a program to compare the identification indicia of the items recorded in the container packing record for the container indicia of a received container with the identification indicia of the items in the customer order list and to provide an output directing the received container to the order packing area if the comparison determines that the received container contains an item necessary to fill a customer order, or directing the received container to the general inventory stock area if the comparison determines that the received container does not contain an item necessary to fill a customer order; and
providing items from the received container after the received container has been directed to the order packing area to assemble and fill the customer order.

2. A shipping method as set forth in claim 1, wherein the individual item identification indicia and the container indicia comprise bar codes affixed to the outer surface of each item or container uniquely identifying identical items and uniquely identifying individual shipping containers.

3. A shipping method as set forth in claim 1, wherein the shipping destination computer is programmed to provide an output directing individual received containers to a particular identified location within a particular order packing area and to provide an output identifying the location of items needed to fill a customer's order in each identified location.

4. A shipping method as set forth in claim 1, wherein the shipping destination computer is programmed to direct material from the general inventory stock area to the packing location as required to complete a shipping order.

5. A shipping method as set forth in claim 4, including the step of releasing the order for packing when all required material is in the order packing area.

6. A shipping method as set forth in claim 1, including the step of providing in each container packing record information identifying the individual shipment with which each container is shipped and wherein the shipping destination computer is programmed to identify the shipping containers that are shipped together in an individual shipment and compare the shipping containers actually received from a single shipment with the containers identified as belonging in the single shipment and provide an output listing the containers lost in shipment.

* * * * *

UNITED STATES PATENT AND TRADEMARK OFFICE
CERTIFICATE OF CORRECTION

PATENT NO. : 5,038,283
DATED : August 6, 1991
INVENTOR(S) : Jack E. Caveney

It is certified that error appears in the above-identified patent and that said Letters Patent is hereby corrected as shown below:

Claim 3, column 4, line 67, delete "in each identified location".

Signed and Sealed this

Twenty-seventh Day of April, 1993

Attest:

MICHAEL K. KIRK

Attesting Officer

Acting Commissioner of Patents and Trademarks